United States Patent [19]
Balliet

[11] Patent Number: 5,919,237
[45] Date of Patent: Jul. 6, 1999

[54] VITAL SERIAL LINK

[75] Inventor: James B. Balliet, Webster, N.Y.

[73] Assignee: General Railway Signal Company, Rochester, N.Y.

[21] Appl. No.: 08/759,770

[22] Filed: Dec. 3, 1996

Related U.S. Application Data

[60] Provisional application No. 60/007,922, Dec. 4, 1995.

[51] Int. Cl.$^6$ .................................................. G06F 17/00
[52] U.S. Cl. ................................ 701/19; 701/24; 701/33; 395/200.3; 364/131
[58] Field of Search ........................ 701/19, 24, 33, 701/39, 43; 395/200.3, 200.62; 364/131, 132, 133

[56] References Cited

U.S. PATENT DOCUMENTS

| | | | |
|---|---|---|---|
| 4,669,044 | 5/1987 | Houser et al. | 364/200 |
| 4,831,521 | 5/1989 | Rutherford | 364/140.02 |
| 4,956,779 | 9/1990 | Rutherford | 701/20 |
| 5,448,564 | 9/1995 | Thor | 370/392 |
| 5,469,507 | 11/1995 | Canetti et al. | 380/30 |
| 5,600,795 | 2/1997 | Du | 395/200.57 |
| 5,754,863 | 5/1998 | Reuter | 395/712 |

*Primary Examiner*—William A. Cuchlinski, Jr.
*Assistant Examiner*—Gertrude Arthur
*Attorney, Agent, or Firm*—Ohlandt, Greeley, Ruggiero & Perle

[57] ABSTRACT

A vital serial link for linking a plurality of data processors which act on information communicated in the form of link information signals, into a vital serial communications network, including at least two vital serial controllers, one for each direction of transmission, in the vital serial link, each controller including a means for storing a plurality of link parameters, each of the link parameters including a numerical relationship indicating that a specified first processor originated a signal and that a designated second processor is to receive said signal, a unique numerical relationship being provided for each possible combination of signal originating processor and signal receiving processor; whereby, upon receipt of a signal, the signal receiving processor can discriminate signals sent to the receiving processor, and determine which processor in said network was the signal originating processor. The link further includes communicating means for communicating signals, including the link parameters, between the data processors of the network.

11 Claims, 17 Drawing Sheets

FIG. 9B

TYPE OF OPERATION

CONVERSION PROCESS COMBINES INTERNAL VALUE AND CONVERSION FACTOR IN POLYNOMIAL DIVIDER

COMBINATION PERFORMED IN POLYNOMIAL DIVIDER (PD)

COMBINATION PERFORMED IN POLYNOMIAL DIVIDER (PD)

SCXKEY IS EXCLUSIVE OR'ED INTO SCXKEY SLOT (OFFSET PRESENT FROM PREVIOUS STEP)

NOTES:

1. EACH LINK TASK IS DIVERSELY PERFORMED USING DIFFERENT SOFTWARE ROUTINES AND LINK DATA VALUES [CH1/CH2]. CH2 TASKS GENERALLY FOLLOW CH1 TASKS DIRECTLY.

2. VPI SYSTEM DOCUMENT SERIES 8 CONTAINS FULL DETAILS TO SUPPORT THIS FLOW CHART

3. A VITAL SERIAL LINK AND VPI SYSTEM CYCLE ARE COINCIDENT AT ONE LOCATION. CYCLE IS ONE SECOND IN DURATION.

TYPE OF OPERATION

OFFSET EXCLUSIVE
OR'ED INTO MSG
CONTENTS AND
WRITTEN DIRECTLY
INTO TRANSMIT RAM

SOFTWARE
POLYNOMIAL DIVISION

SOFTWARE
POLYNOMIAL DIVISION
TO FORM SUM. RESULT
EXCLUSIVE OR'ED WITH
OFFSET / LNXKEY.

\* PARALLEL ENCODED
CHECK AND LINK
PARAMETERS
CONVERTED INTO
SERIAL IMAGE AND
CHECK FIELD MSG
STRUCTURE

FIG.10B

TYPE OF OPERATION

EXCLUSIVE OR OFFSET
INTO CHECKFIELD

SOFTWARE PD AND
EXCLUSIVE OR

SOFTWARE PD AND
EXCLUSIVE OR

FIG.11B

TYPE OF OPERATION

OFFSET EXCLUSIVE OR'ED INTO MSG CHECK FIELD

PD AND EXCLUSIVE OR

POLYNOMIAL DIVISION

EXCLUSIVE OR

VITAL SERIAL LINK

This application claims the benefit of Provisional application Ser. No. 60/007,922, filed on Dec. 4, 1995, in the United States is claimed under 35 U.S.C. §119.

FIELD OF THE INVENTION

The present invention is directed to a communications network for linking components of a railway signaling system, and particularly to a point to point vital serial link for exchanging vital state parameters between vital processors in a railroad control system and control devices such as signal lamps, control relays and switches, without the need for vital network hardware, or dependency on communication protocols or error free software.

BACKGROUND OF THE INVENTION

NISAL (Numerically Integrated Safety Assurance Logic)-based systems for use in railroad signal controlling devices have been known, and are described, for example, in U.S. Pat. No. 4,956,779 assigned to the assignee of the present application, being incorporated herein by reference. NISAL is a numerically based safety principle which relies on mathematical algorithms to verify the accuracy of a signal, thereby rendering the signal "vital". A method and apparatus for effecting vital functions without the use of vital hardware, is described in U.S. Pat. No. 4,831,521, assigned to the assignees of the present application, being incorporated herein by reference. The latter reference describes processors and systems which are known as vital processing interlocking systems, which are rendered vital by means of numerically based safety principles. However, when it becomes necessary to link together such systems a vital link between such processors has to be established and maintained to avoid the misdirecting of signals, and the transmittal of signals which include corrupted data. Therefore, there has been a need for transmitting signals between vital processors using a vital communications link that does not rely on vital hardware, communication protocols or error free software.

Accordingly, it is a fundamental object of the present invention to provide a point-to-point serial communications network for exchanging vital state parameters between interlocking vital processor control systems using numerically based safety principles in place of conventional vital link hardware, such as that disclosed in U.S. Pat. No. 4,956,779.

Another principal object is to enforce link vitality between processors by having the link processors exhibit a specific numerical relationship with one another.

Another object is to include a dynamic offset embedded within the link messages.

A further object is to provide a software arrangement which generates the link application data needed by the hardware to execute link assignments.

SUMMARY OF THE INVENTION

The above and other fundamental objects of the invention are achieved by applying numerically based safety principles to a serial link for linking a plurality of data processors which act on information communicated in the form of link information signals, into a vital serial communications network.

More specifically, the invention resides in the provision of a vital serial link for linking a plurality of data processors, which act on information communicated in the form of link information signals, into a vital serial communications network, including at least two vital serial controllers, one for each direction of transmission, in the vital serial link, each of the controllers including means for storing a plurality of link parameters, each of the link parameters including a numerical relationship indicating that a specified first processor originated a signal and that a designated second processor is to receive the signal, a unique numerical relationship being provided for each possible combination of signal originating processor and signal receiving processor; whereby, upon receipt of a signal, the signal receiving processor can discriminate signals sent to the receiving processor, and determine which processor in said network was the signal originating processor, the link further including communicating means for communicating signals including the link parameters, between the data processors in the network.

A more specific feature of the invention can further be provided with means for enabling each of the vital serial controllers to generate check information indicating that a data memory of a processor has been cleared of prior link information, and that system memory and application memory integrity has been maintained, each time a subsequent link information signal is received.

Other and further objects, advantages and features of the present invention will be understood by reference to the following specification considered in conjunction with the annexed figures.

DETAILED DESCRIPTION

A serial communications network has been achieved in accordance with the present invention whereby vital state parameters can be exchanged between vital processing or related interlocking control systems. Referring to FIG. 2, there is shown a software implemented vital-serial link used to establish vital communications between vital processors. This vital serial link can be realized as a communications controller in the form of a vital serial controller (VSC) 10; and more specifically, as a vital serial controller circuit board assembly with resident safety software. In the scheme of the present invention, a vital serial controller 10 (FIG. 1) is programmed with generic system safety software, contained in system EPROM 24; and link specific application data in application EPROM 26.

Figure 1:
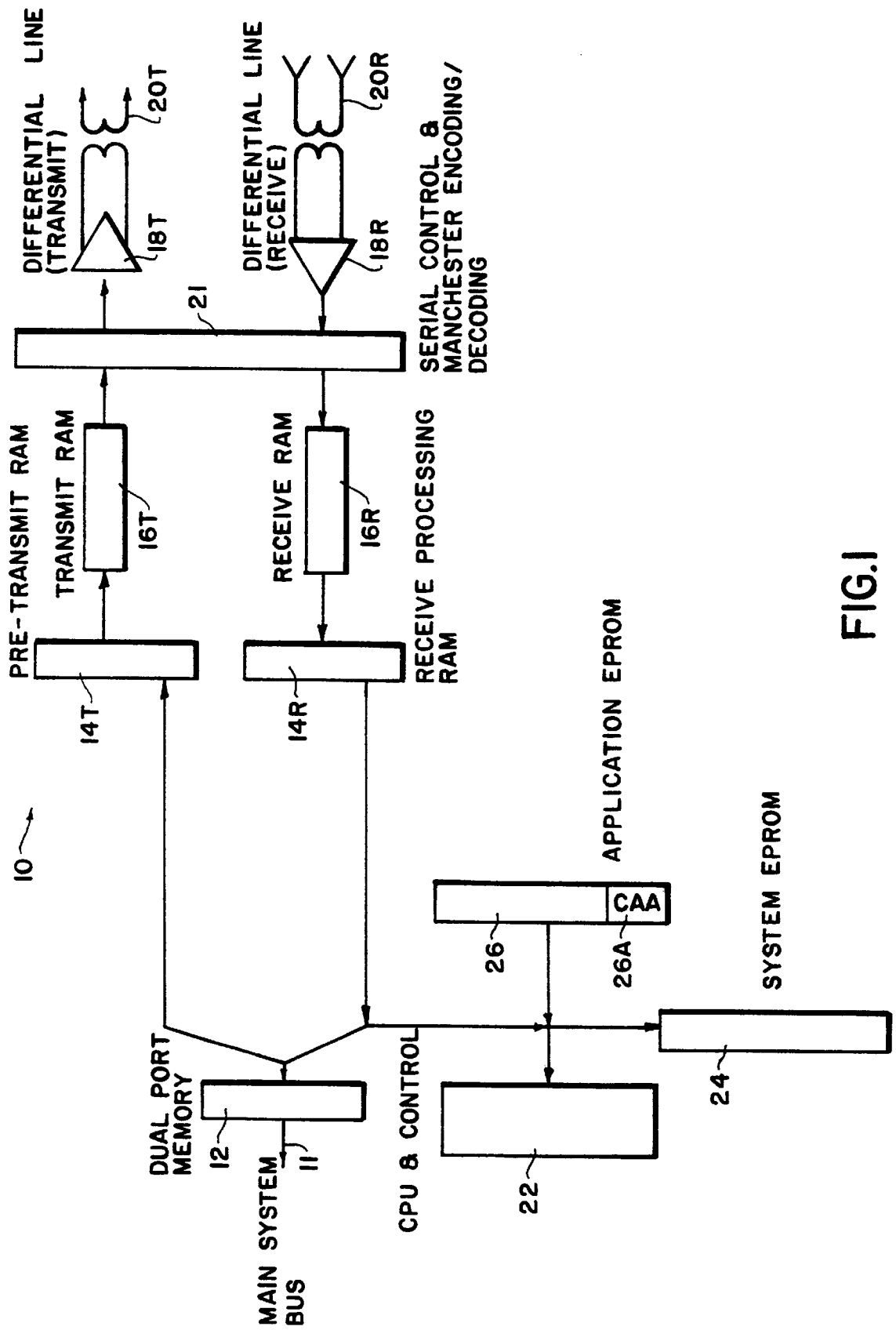
FIG. 1 is a block diagram of a vital serial link implemented by means of a vital serial controller.
Figure 2:
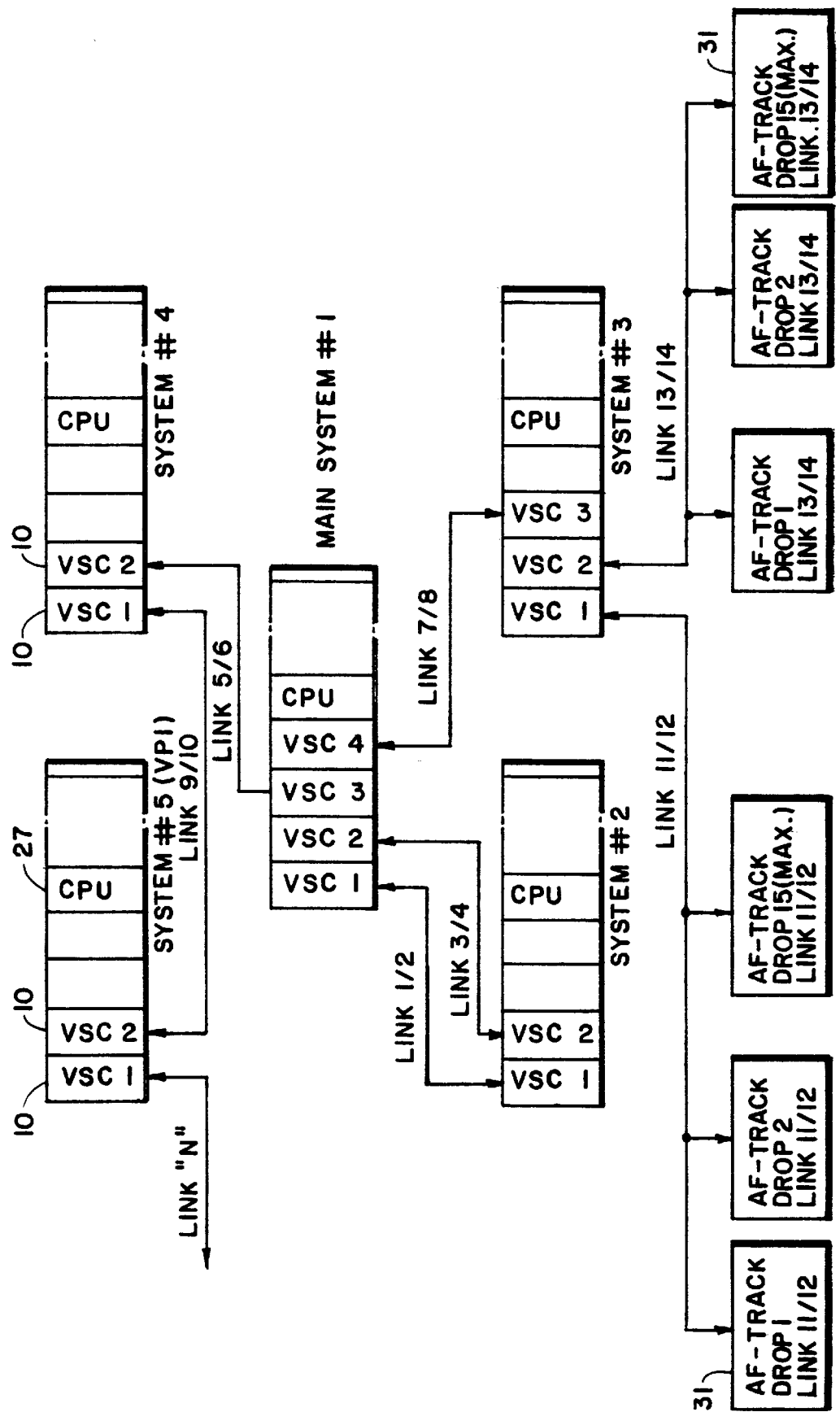
FIG. 2 is a block diagram illustrating a serial link application involving a group of vital processing interlocking systems, as well as audio frequency track circuits, which function as multi-drop modules, all linked together by means of vital serial controller circuit boards.

The vital serial controller 10, seen in FIG. 1, is connected via a main system bus 11 from a processor, such as a VPI (See FIG. 2, e.g. system #5) thence to a dual port memory 12. Separate transmission paths extend from memory 12 to pre-transmit RAM 14T and from receive processing RAM 14R, there being at least one transmit channel and one receive channel for each processor. Pre-transmit RAM 14T is connected to transmit RAM 16T, which transmits signals to amplifier 18T and thence out over differential line drive (transmit) 20T, after passing the signals through a serial control and Manchester encoding/decoding device 21. Similarly, received messages are passed from a differential line receive device 20R to amplifier 18R, which is connected to the encoding/decoding device 21. After decoding, signals pass through receive RAM 16R to receive processing RAM 14R.

It will be understood that while only one VSC 10 is shown in FIG. 1, a complementary VSC 10 is provided in a back-to-back relationship with the one VSC 10 so that transmitted signals flow in two directions (see FIG. 2 in which complementary VSCs link systems are seen, such as #4 and #5, as well as the others shown). In operation, an applications engineer provides input to the personal computer resident Computer Aided Application (CAA) software 26A which generates the link specific application data needed by the hardware to execute link assignments. The resulting data files are placed in the EPROM 26 of the controller, and are further included within the processors, (VPI) CPU application data EPROM 27. Each of the vital serial controllers 10 connected in the network thus stores a plurality of link parameters, each of which includes a numerical relationship indicating that a specified first processor originated a signal and that a second processor is to receive the signal, a unique numerical relationship being provided for each possible combination of signal originating processor and signal receiving processor. It is through this numerical relationship that link vitality is enforced. Upon receipt of a signal, the signal receiving processor can therefore discriminate signals transmitted to the receiving processor, and determine which processor in the network originated the signal. These link parameters are preferably in the form of 32 bit codewords.

A complete linked network, including both links to audio frequency (AF) modules or multidrops 31, as well as VPI to VPI links is shown in FIG. 2. Each vital serial controller installed in a VPI acts as a master processor. Upon receipt of a signal including such a link parameter, a drop processor controller vitally decodes the link message and vitally selects data specifically designated for receipt by the receiving drop processor. These drop processors correspond to devices such as signal lights and switches.

For each VPI there can be eight total links in any system (four in the transmit direction and four in the receive direction (as shown, for example, for main system #1), each with 200 link parameters per link. The link parameters are grouped into blocks of 200 and assigned a block number by the applications engineer. No two links in any system can utilize the same block of parameters. This relieves the system software from the burden of internally proving parameters are from specific links.

Figure 3:
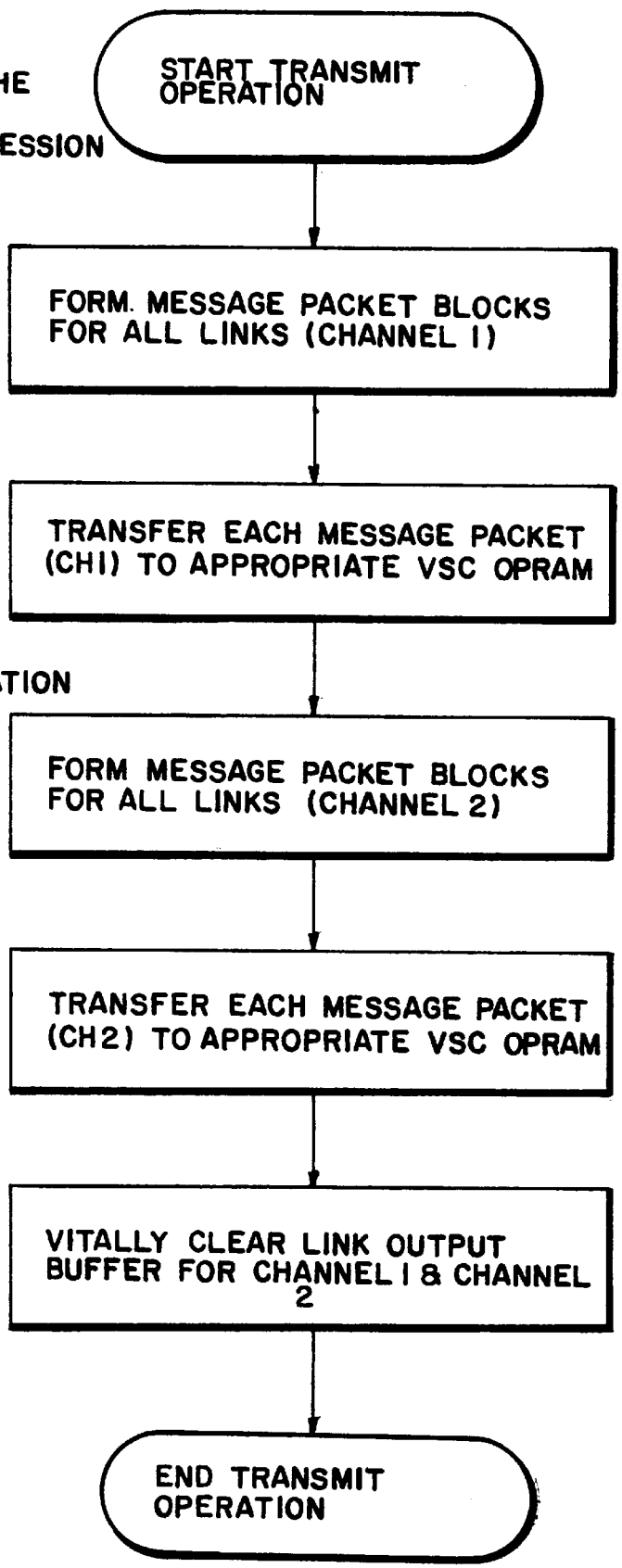
FIG. 3 is an exemplary flow chart for transmit processes performed on the processor.

The invention is directed to the basic operation of a vital processor interlocking (VPI) vital serial link, which controls the transfer of vitally encoded data between VPI systems or subsystems over a standard communications medium. Techniques developed under the guidelines of Safety Assured Logic are employed to carry out the vital processes involved in the serial link operation. All vitally oriented data, including parameter values, link checkwords, and the like, are assigned values from the available codeword list set aside by the Computer Aided Application (CAA) software for use by the VPI. Vital processes are implemented using diverse software and data where necessary. The description set forth below is limited to a description the operation of one of two software channels (FIG. 3). This description covers the link processes performed for one link for a typical one second cycle.

Once each second, two 32 bit representations of the state of each link parameter are created by the processor's system software using diverse software in two data channels CH1 and CH2 (FIG. 3). Link parameters can be created for mostly any interlocking function existing within the local processor (track circuits, switch machine control/correspondence, signal calls, etc.) These link parameters are grouped into message packets as determined by the LINK DEFINITION FILE and passed to the assigned vital signal controller (VSC) circuit board. This message packet is then compressed using vital techniques into a form which better facilitates serial data transfers (200 32-bit vital link parameters maximum in one channel, one link direction are compressed into 38 bytes of transmitted message for point to point applications, and 450 32-bit vital link parameters in one channel, one link direction are compressed into 68 bytes of transmitted message for multi-drop 31 applications).

At the receiving end, the serial message is reconstructed into a message packet similar to that at the transmit end. This reconstruction is performed by vital software and application data (assigned to that link) resident on the VSC or the AF track module. The message packet at this point does not possess any permissive TRUE parameter values. Only after it is passed to the CPU is the final processing performed in point to point applications. In multi-drop applications, the portion of the vital message that is intended for a given AF Track module is extracted from the complete reconstructed message and then further decoded. If all link operations have been performed correctly, those parameters evaluated into TRUE permissive states by the transmit end processor will attain a TRUE permissive state within the receive end processor or AF Track module.

Below is a more detailed description of the processes involved in passing data via one of four possible serial links within a VPI system from its originating end to its final destination. An exemplary flow chart for transmit processes performed in the CPU is shown in FIG. 3.

Near the end of each one second cycle, vital serial output buffers (designated VSO) located in the RAM of the CPU are filled with vital parameters to be transmitted to downlink systems. As previously noted, these parameters are created by converting 32 bit evaluated results in the current system cycle (i.e. expression results, vital input reads, etc.) into link parameter values. The conversion process is accomplished by combining in the polynomial divider, a preconditioning constant unique for the link function (and stored in the application EPROM), with the current cycle evaluated result of the interlocking function if the system evaluated result is TRUE. If FALSE, the correct link FALSE link parameter value is placed in the VSO. Each parameter, if calculated correctly, is represented by a unique TRUE or FALSE value (in two diverse data channels, CH1 and CH2) set aside by the CAA for vital serial link messages. These parameter values are VPI codewords and are not used elsewhere in any VPI system which is connected using serial links.

The inventive serial link can further be provided with means for generating link checkwords, or keys. Each processor that operates on link information produces check information in the form of link keys. The link key provides proof that the processor has cleared its data memory of prior signal information and that the integrity of the system and application memories is intact. The CPU 27 of the vital processor originates the first link key. Each processor that subsequently receives the signal augments this result with an additional link key. The succeeding result then becomes the link key assigned to the last processor that has added a link key. Any failure encountered in the formation of link messages corrupts the link key at the point of failure. Any subsequent processor that subsequently receives the signal containing the corrupted link key will assign a link parameter associated with a most restrictive state to insure the safety of the system.

Link key assignments also prevent the incorrect installation of application software in the CPUs of vital serial controllers or improper external link connections from permitting permissive results from being formed in the receiving processor. The link identity corresponds to an assignment made by the application engineer as input to the CAA 26A.

One of the most likely failures encountered in a communications link is the possibility that old information resides within one or more of the linked processors, or within the communications channel there-between. This is especially true of state-of-the-art modems that contain large amounts of memory in order to facilitate high speed operation. In order to maintain a vital interface, it is therefore advantageous to provide means for insuring that information received by a receiving processor is valid, current, and in a sequence known to be created by the transmitting processor.

The vital serial link of the invention can therefore be provided with a dynamic offset function including a set of offset parameters embedded within each intersystem message transmitted over the link. An offset parameter in a subsequent signal therefore has a cycle offset by a predetermined amount relative to the previous signal. The freshness of any received signal can therefore be determined by each controller through formation of a system checkword including both a current and previous offset parameter and determination of whether there is an offset between the cycles thereof. This feature allows link architecture to take any path using commercial equipment without fear of misrouting or storage of erroneously valid permissive parameters.

The invention as described above, serves the function of a software implemented vital parallel-to-serial-to parallel converter. The executable software represents the individual states of the system outputs (driven in the prior art by discrete output circuits) in a serial compressed form and transmits this information to other systems where it is reconstructed for use by the receiving system. Hardware failures that occur to discrete outputs or connected inputs must result in that output or input being driven to the more restrictive state. Similarly, hardware or software errors in the link must cause the link parameters to become more restrictive. Failures that occur within the link cause all parameters associated with the affected link to attain a more restrictive parameter state. Thus, vital operation can be achieved using numerically based safety principles without relying on the use of vital hardware.

Although a complete description sufficient for one skilled in the art to practice the present invention has already been given, it is thought useful to provide a more detailed appendix which summarizes in flow chart and tabular form the operations involved in accordance with the present invention.

Initially, it is well to first refer to FIGS. 4 thru 8 according to which the four main link key calculations performed across the vital serial link in one direction are shown. An example of the first is the source CPU key formation (SCXKEY) seen in FIG. 4. This value is created at the transmit end VPI CPU board 27 (FIG. 2) under control of the VPI system software, it being recalled that in FIG. 2 the linking of two VPI systems is illustrated. The value SCXKEY is included within the message packet as provided to the transmit end VSC 10. Its value generally includes other check values calculated within the VPI CPU program that relate to link operations. One value proves previous cycle link data from VPI CPU 27 has been vitally erased, one value proves all prior processing checks within the VPI CPU program are correct, and the last is a numerical value identifying the system cycle sequence number (this result is termed an "offset").

The process of forming the final SCXKEY is:

1) get the previous cycle VPI CPU offset from VPI CPU RAM and load it into the Polynomial Divider (PD). See FIG. 4; 2) "add" an offset increment value to the PD ("add" infers an exclusive or-ing as seen of the added parameter to the previous contents of the PD, followed by shifting of the registers which are included as part of the Polynomial Divider (PD); 3) Initialize the SCXKEY slot in the link message with the newly calculated current cycle offset value; 4) obtain a preconditioning constant from the VPI CPU application EPROM and place it in the Polynomial Divider (PD); 5) get the value from VPI CPU RAM that represents the system processing checks MCKSUM and "add" it to the Polynomial Divider (PD); 6) get the vital clearing result VSOCLR from VPI CPU RAM and "add" it to the Polynomial Divider (PD); 7) obtain from the PD the base SCXKEY result and exclusive OR the result into the pre-initialized (with cycle offset) SCXKEY slot.

Figure 4:
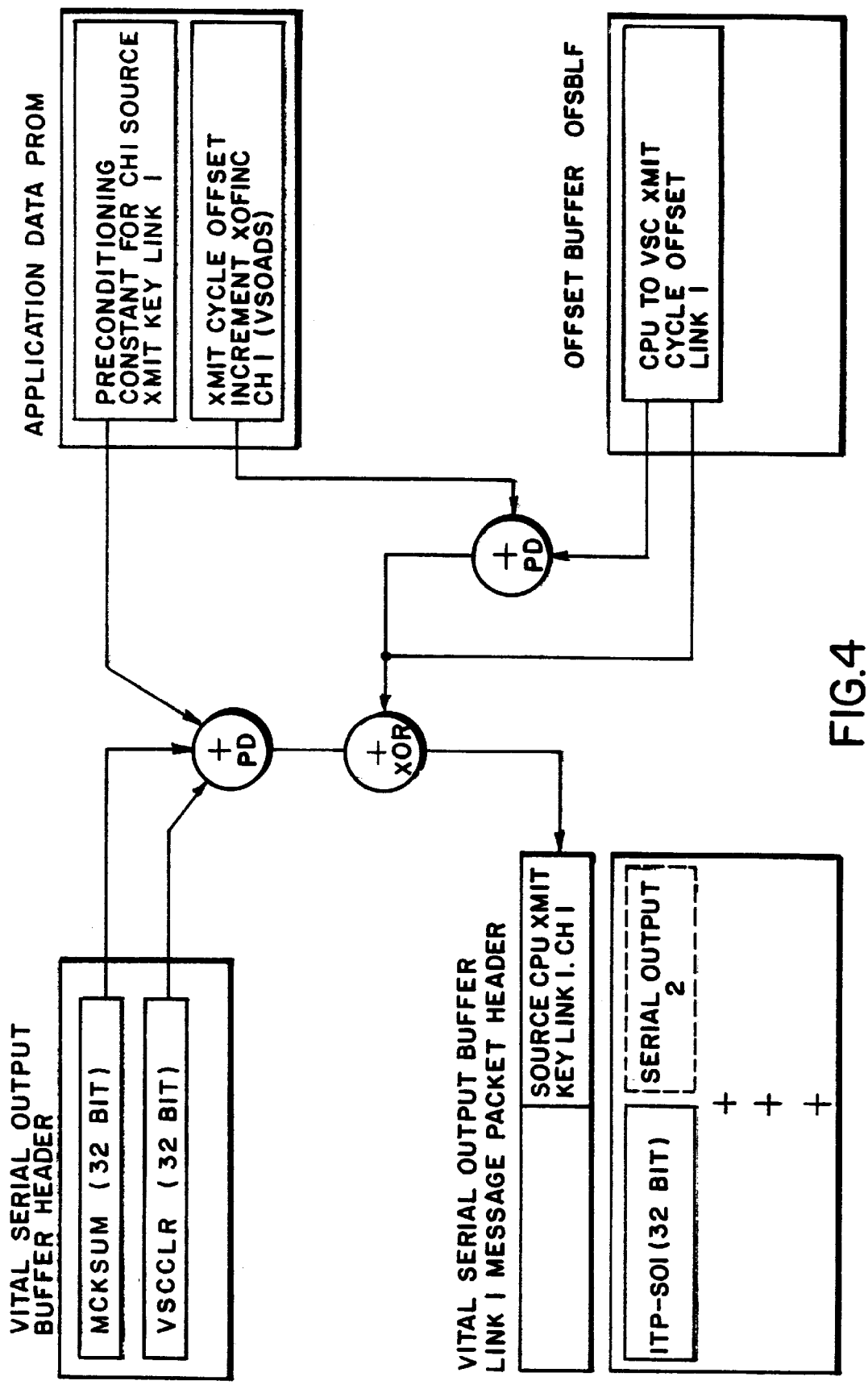
FIG. 4 is a functional diagram depicting a source CPU transmit key formation.

This unique final result proves the origination, the currency, and the correctness of the link operations on the VPI CPU. All results are calculated each cycle. Only the preconditioning constant resides in memory (FIG. 4). This operation takes place twice each system cycle with unique CH1 data, and then CH2 data.

Figure 5:
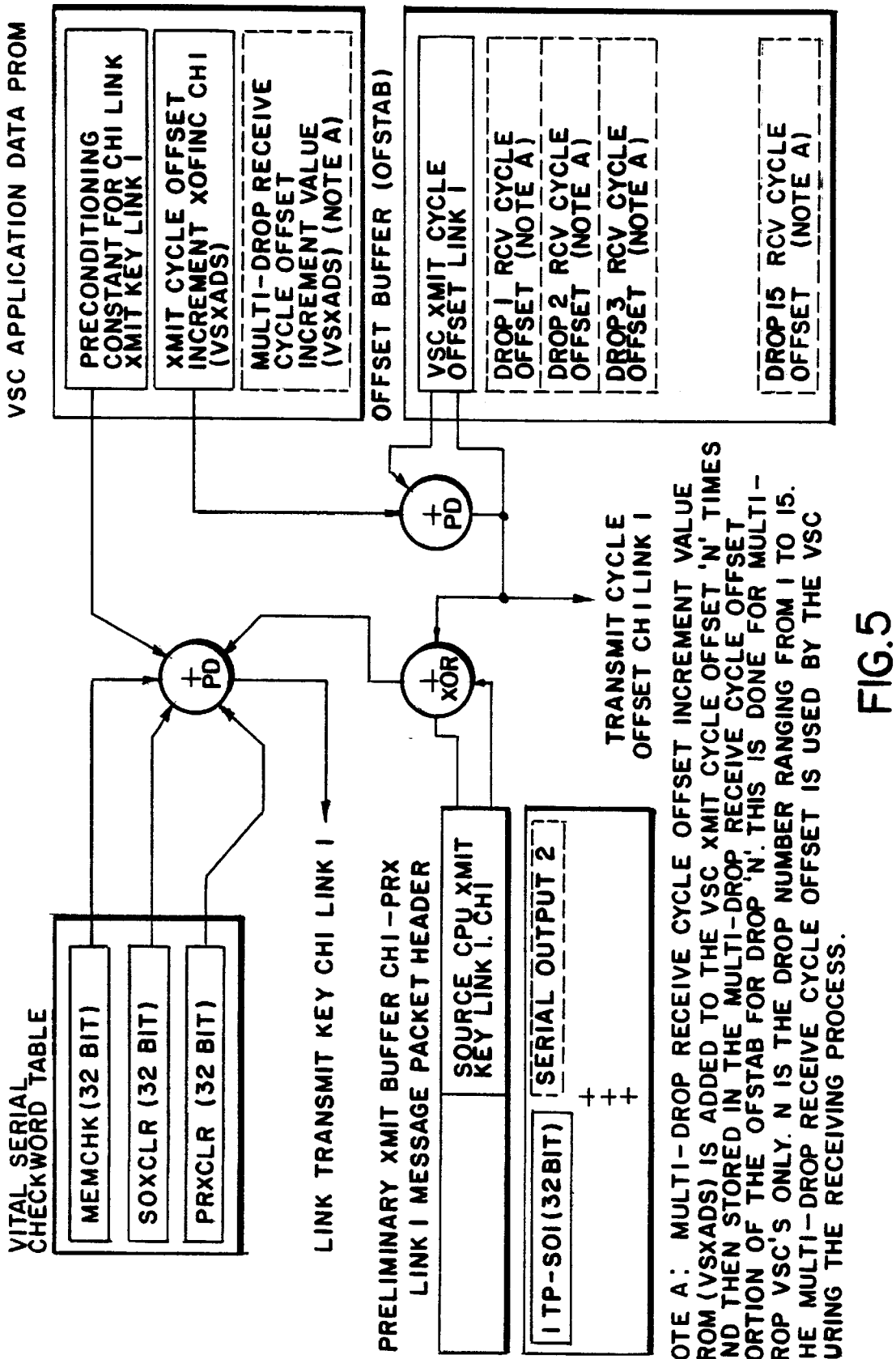
FIG. 5 is a functional diagram illustrating a link transmit key formation.
Figure 6:
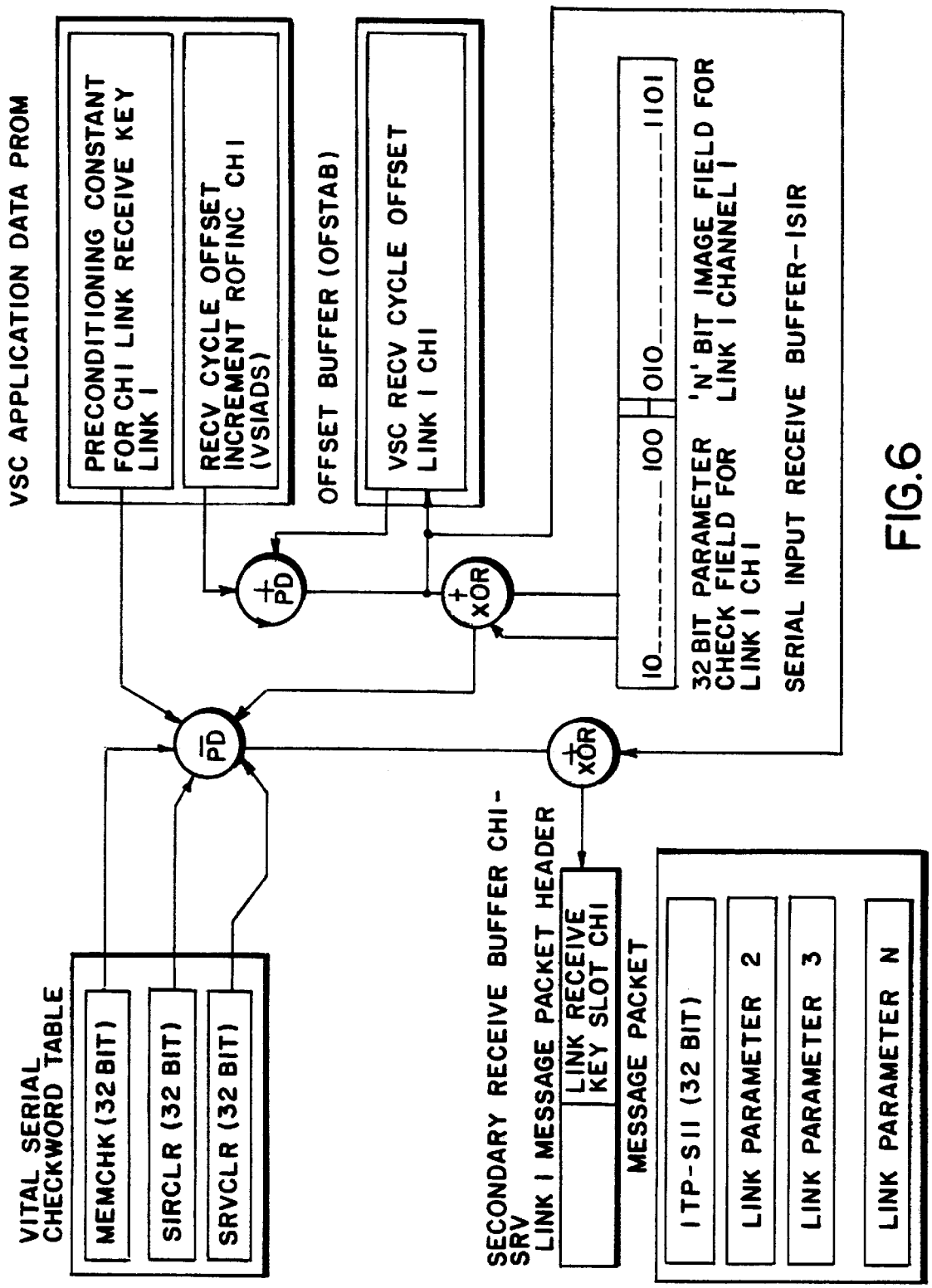
FIG. 6 is a functional diagram illustrating a point-to-point VSC link receive key formation.
Figure 7A:
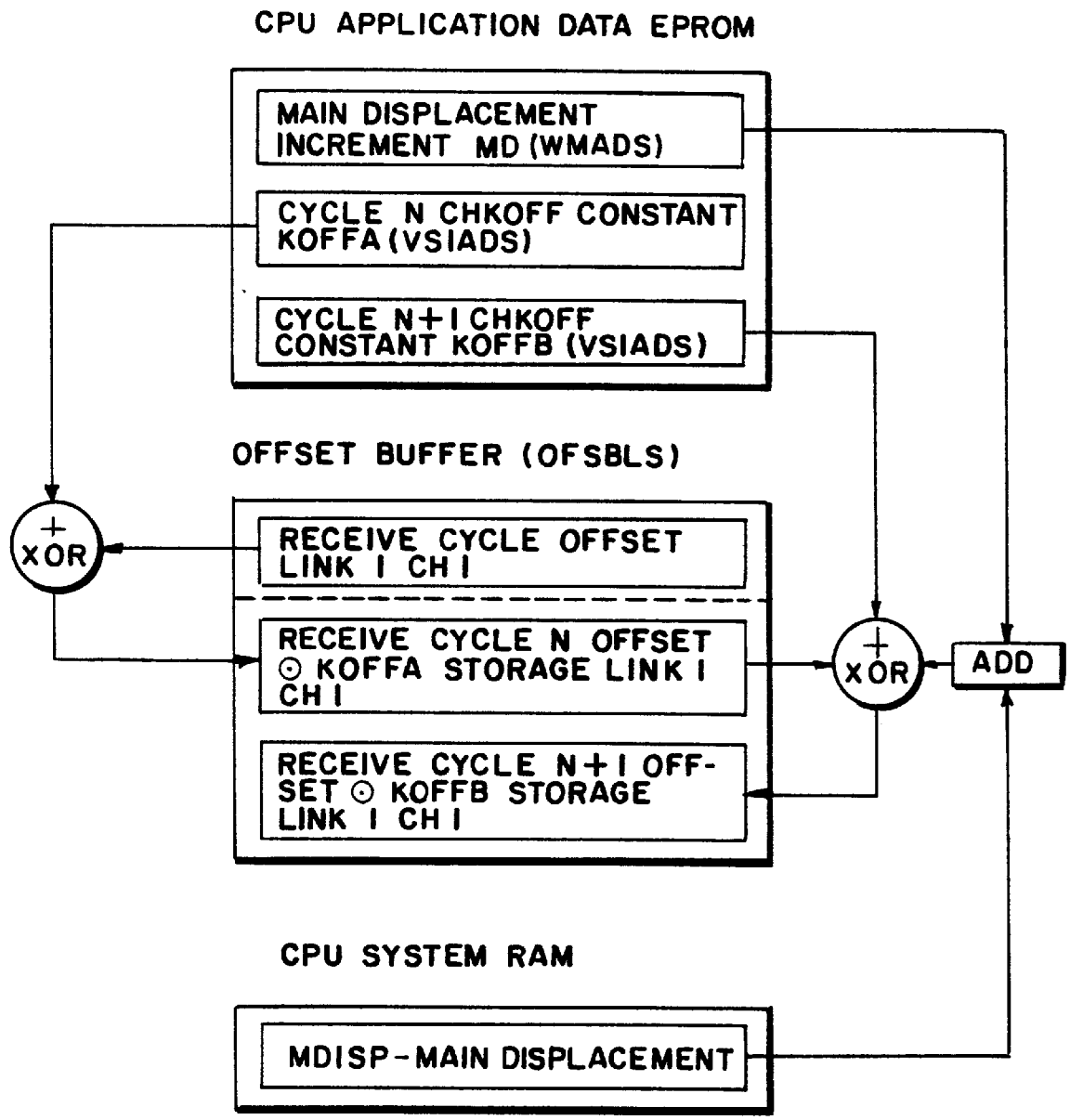
FIG. 7 is a functional diagram illustrating the calculation of check off (CHKOFF).
Figure 7B:
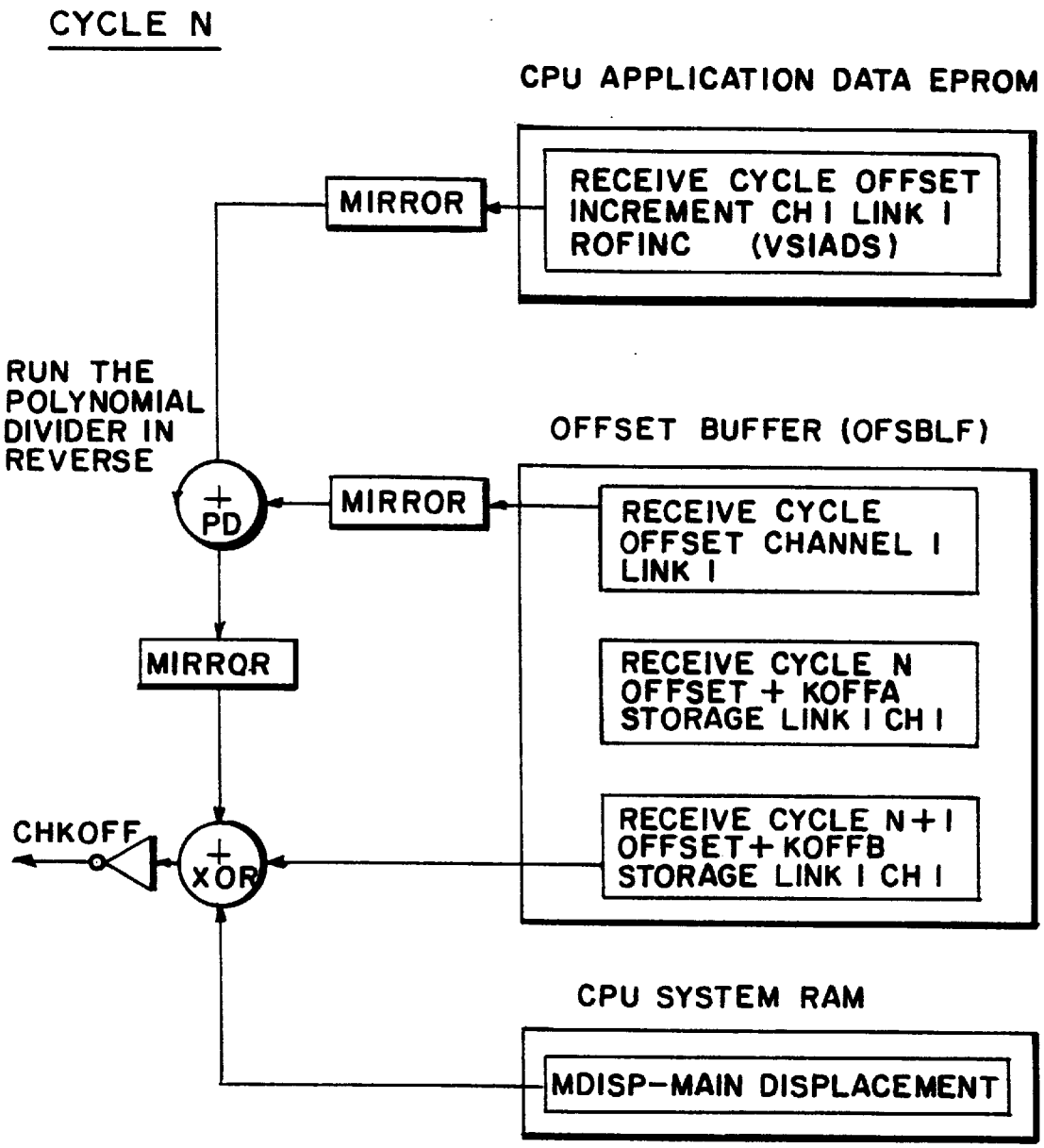
Figure 8:
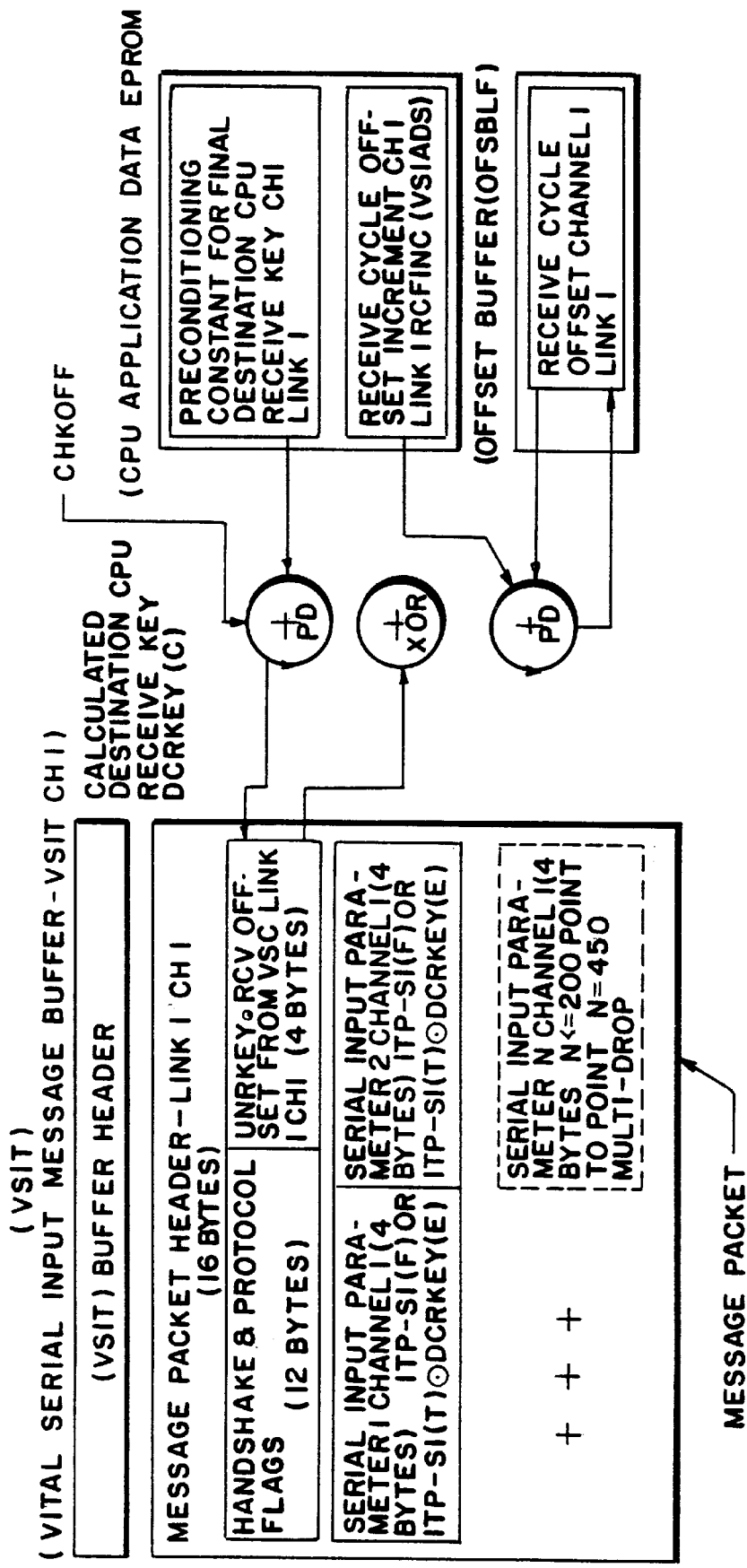
FIG. 8 is a functional diagram illustrating the calculation of the destination CPU receive key from (VSIT) contents on the CPU.
Figure 9A:
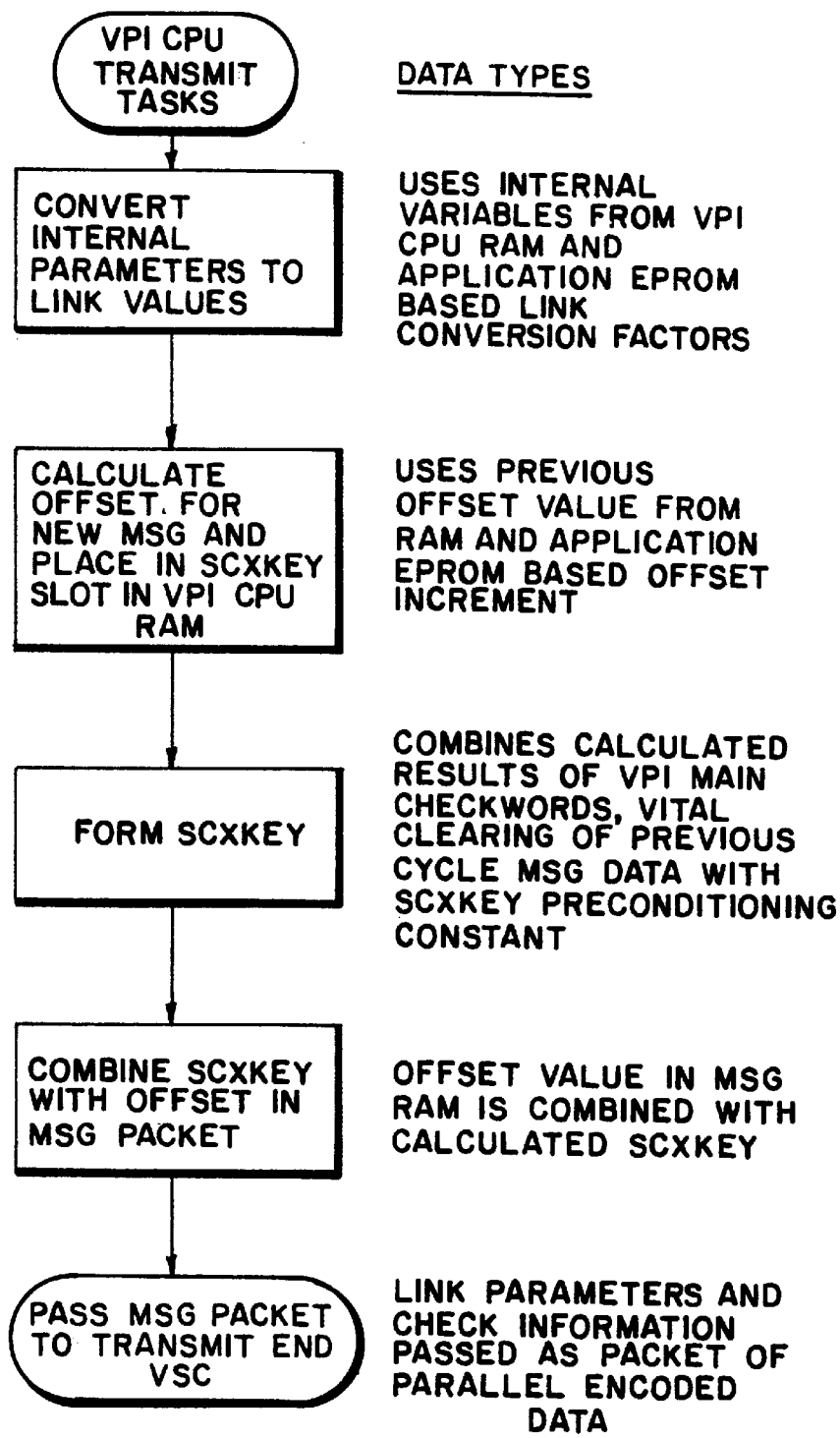
FIGS. 9 thru 12 provide flow charts depicting the complete vital serial link operations; also provided are listings of the data types and type of operations that are involved.
Figure 10A:
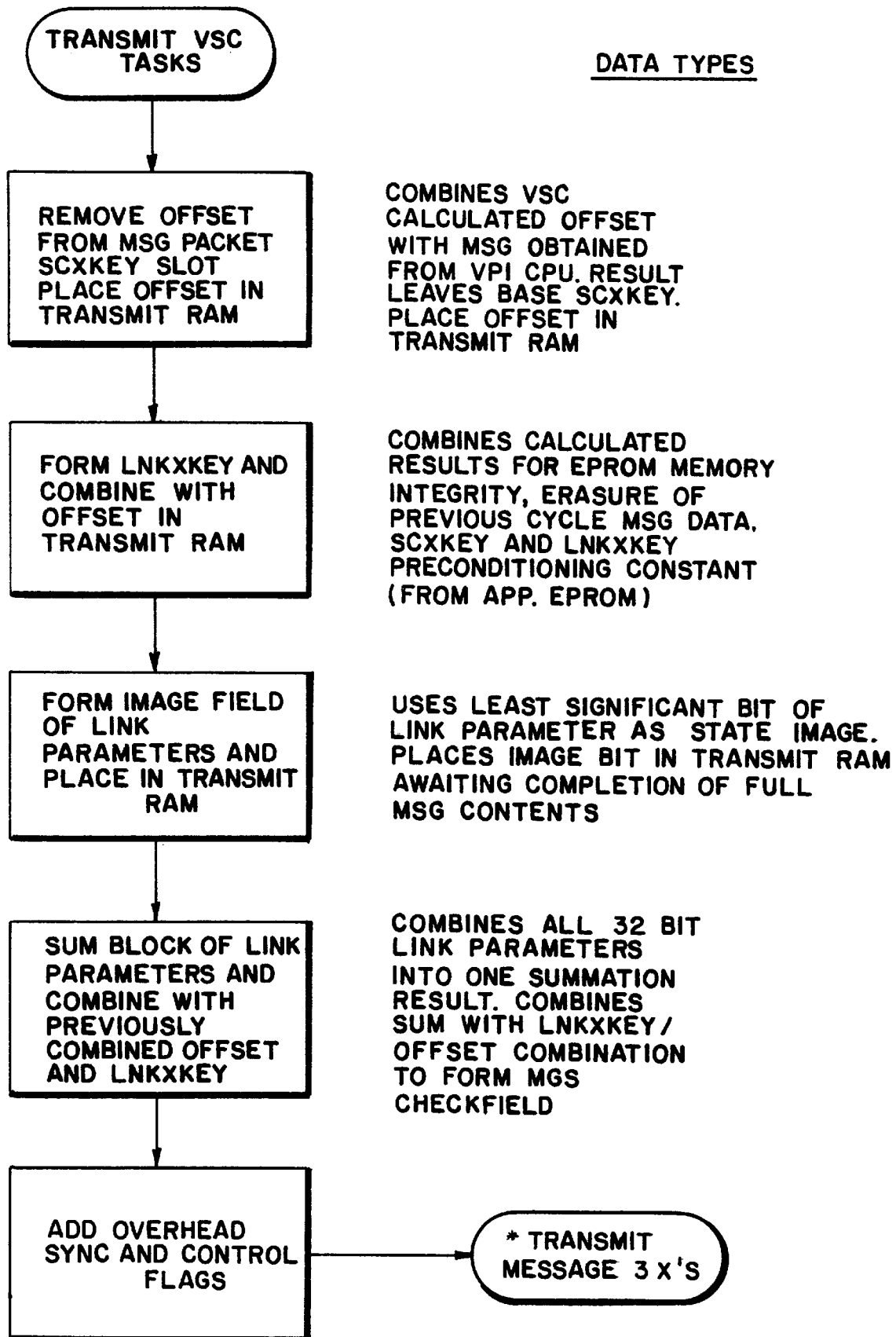
Figure 11A:
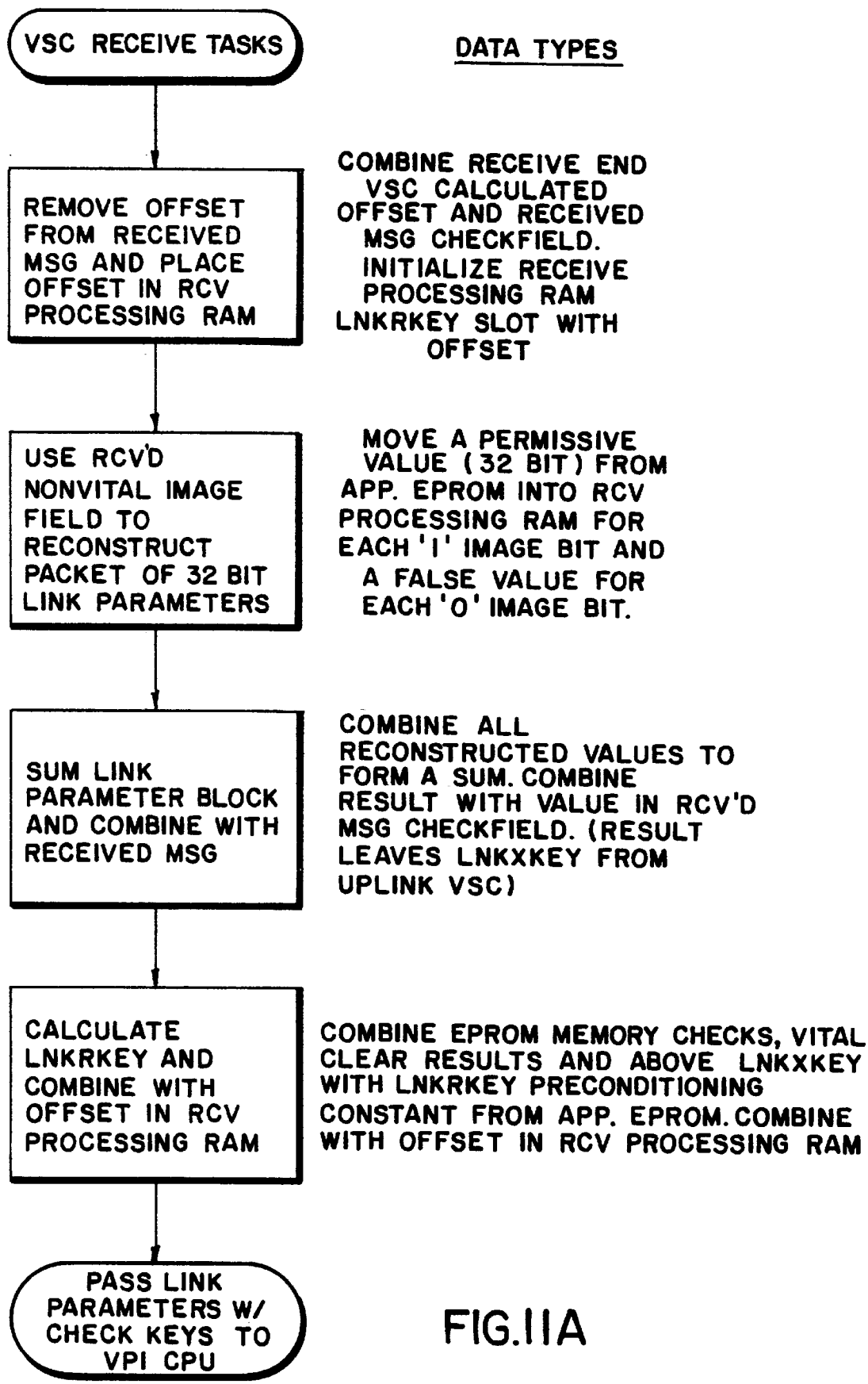
Figure 12A:
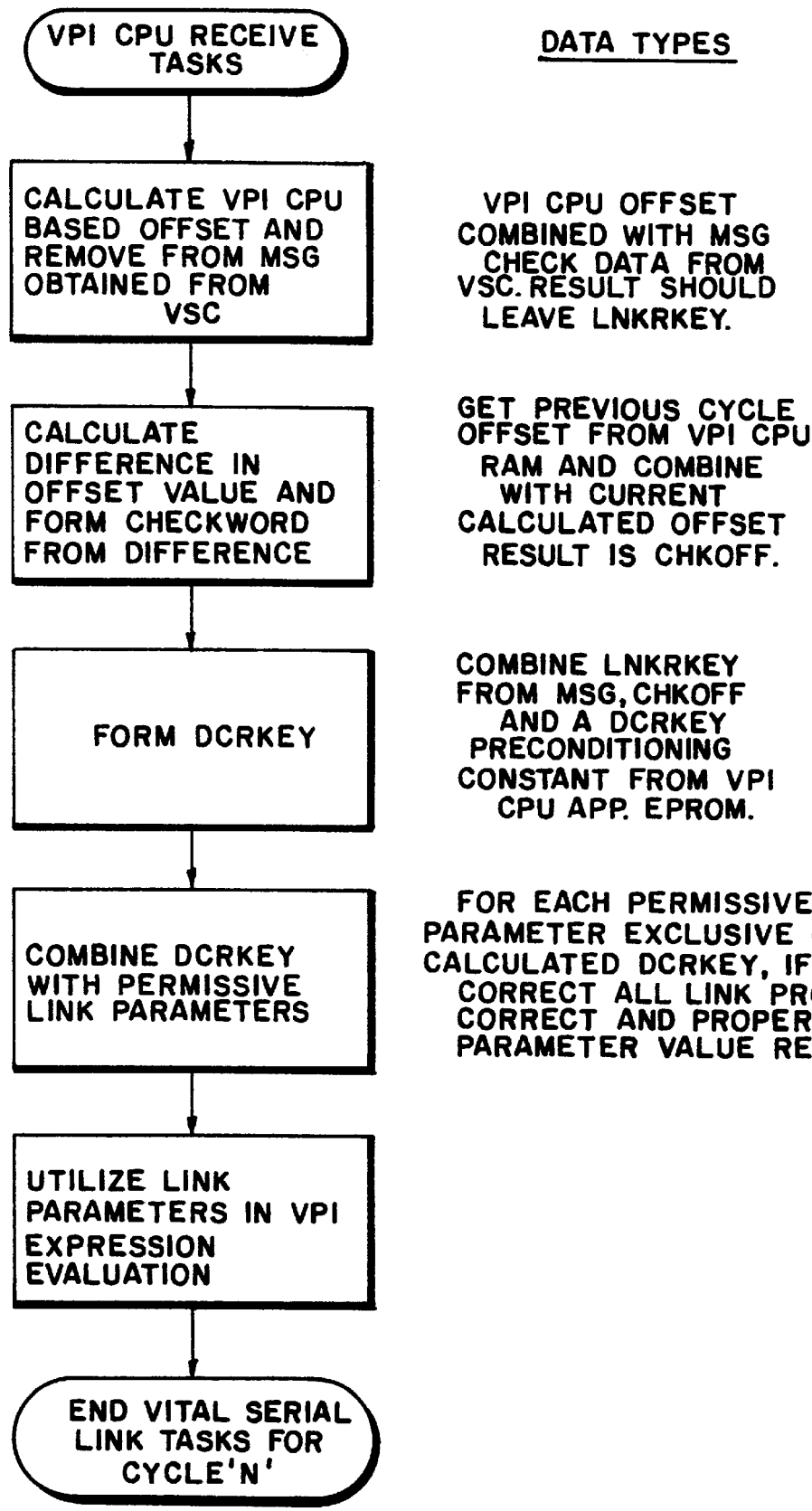

Referring now to FIG. 5, the Link Transmit Key (LNKXKEY) is formed on the transmit end VSC 10. The Link Receive Key (LNKRKEY) is formed on the receive end VSC (FIG. 6); and the Destination CPU Receive Key (DCRKEY)—(FIG. 8) is formed on the receive end VPI CPU, each result using CH1 and CH2 data. The link key formations are performed for each direction of link data transmission. The formation of the link checkword verifying that the offset has incremented each cycle, CHKOFF, is shown in FIG. 7 for both cycle N-1 and cycle N. This result is used in the final calculation of DCRKEY.

It will be apparent to those skilled in the art that along the link data path each processor obtains the link key from the previous link processor and combines it (in a Polynomial Divider operation with the other constituents of the link key formation). For example, the transmit end VSC forms LNKXKEY by combining, in a software polynomial division operation, calculations verifying VSC System and Application EPROM memory integrity, vital clearing of previous cycle link data, and the SCXKEY provided by the transmit end VPI CPU. In this way, the more downlink processor contains an all inclusive link key check (based on utilizing uplink keys). All values are current and reside in RAM. A preconditioning constant resides in VSC EPROM only.

It would likewise be understood that vital serial link processing discussed above, like all VPI related vital software activities, is executed by diverse sets of software operating on diverse data values designated CH1/CH2. Both channel operations must execute properly in order for permissive link parameters to exist.

While there has been shown and described what is presently considered the preferred embodiment of the invention, it will be appreciated by those skilled in the art that modifications of these embodiments can be made without departing from the spirit of the invention. In particular, it is noted that although the invention has been described with respect to a railway control system, the invention is equally applicable to any modem and/or telecommunication network. It is therefore the intent of the inventors that the scope of the invention be limited only by the claims appended hereto.

What is claimed is:

1. A vital serial link for linking, in a railway signaling system having two opposite directions of transmission, a plurality of data processors which act on information communicated in the form of link information signals, into a vital serial communications network, said vital serial link comprising:

at least two vital serial controllers, connected to respective processors, each controller operating in both directions of transmission, said controllers being connected in back-to-back relationship in the vital serial link, each of said controllers including:

means for storing a plurality of link parameter signals, each of said link parameter signals including a unique numerical relationship indicating that a specified first processor originated a signal and that a designated second processor is to receive said signal, the unique numerical relationship being provided for each possible combination of signal-originating processor and signal-receiving processor; wherein upon receipt of a signal, said signal receiving processor can discriminate signals sent to said receiving processor, and determine which processor in said network was the signal originating processor;

said vital serial link further comprising communicating means for communicating signals, including said link parameter signals, between said plurality of data processors in said network.

2. The link of claim 1 wherein said storing means is an EPROM.

3. The link of claim 1 wherein said communications means is a twisted pair.

4. The link of claim 1 wherein said link parameters are in the form of 32 bit codewords.

5. The link of claim 1 wherein said codewords are assigned by a Computer Aided Application software package.

6. The link of claim 1 further comprising means for enabling each of said vital serial controllers to generate check information indicating that a data memory of a processor has been cleared of prior link information, and that system memory and application memory integrity has been maintained, each time a subsequent link information signal is received.

7. The link of claim 6 wherein check information is generated in the form of link keys.

8. The link of claim 7 wherein a first processor generating a signal originates a first check key that is added to said check information, and that each subsequent processor receiving said signal augments said check information with an additional link key.

9. The link of claim 8 wherein a checkword, augmented with a link key by an augmenting processor is assigned as a link key for said augmenting processor.

10. The link of claim 9 wherein any failures indicated in said link messages corrupts said link key at a point of failure and causes all subsequent processors receiving the corrupted link key to assign a link parameter corresponding to a most restrictive state.

11. The link of claim 1 further comprising means to provide a dynamic offset function, said dynamic offset function-producing means including a set of offset parameters embedded within each signal transmitted over said link, an offset parameter in a subsequent signal having a cycle offset by a predetermined amount relative to a previous signal, freshness of any received signal being determined by each controller through formation of a system checkword including both a current and previous offset parameter and determining whether there is offset between the cycles thereof.

* * * * *